(12) United States Patent
Mekis et al.

(10) Patent No.: US 6,920,257 B1
(45) Date of Patent: Jul. 19, 2005

(54) RESONATOR CAVITY FOR OPTICAL ISOLATION

(75) Inventors: Attila Mekis, Martinsville, NJ (US); Sergey Frolov, Berkeley Heights, NJ (US)

(73) Assignee: Inplane Photonics, Inc., South Plainfield, NJ (US)

( * ) Notice: Subject to any disclaimer, the term of this patent is extended or adjusted under 35 U.S.C. 154(b) by 0 days.

(21) Appl. No.: 10/395,901

(22) Filed: Mar. 24, 2003

(51) Int. Cl.[7] ................................................. G02B 6/26
(52) U.S. Cl. ............................ 385/14; 385/15; 385/39; 216/24
(58) Field of Search ............................. 385/14, 15, 39; 216/24

(56) References Cited

U.S. PATENT DOCUMENTS

| | | | |
|---|---|---|---|
| 4,902,086 A | 2/1990 | Henry et al. | 350/96.12 |
| 5,093,884 A | 3/1992 | Gidon et al. | 385/132 |
| 5,749,132 A | 5/1998 | Mahapatra et al. | 29/25.35 |
| 2002/0172237 A1 * | 11/2002 | Murry et al. | |
| 2002/0181829 A1 * | 12/2002 | Margalit et al. | |
| 2003/0026522 A1 * | 2/2003 | Chiaretti | |

FOREIGN PATENT DOCUMENTS

| | | | | |
|---|---|---|---|---|
| EP | 0 883 000 A1 | 12/1998 | | G02B/6/00 |
| WO | WO 02/097491 A1 | 12/2002 | | G02B/6/12 |
| WO | WO 03/007034 A1 | 1/2003 | | G02B/6/122 |

* cited by examiner

*Primary Examiner*—John R. Lee
*Assistant Examiner*—Zia R. Hashmi
(74) *Attorney, Agent, or Firm*—Mayer Fortkort & Williams PC; Stuart H. Mayer, Esq.

(57) ABSTRACT

A planar lightwave circuit is provided that includes a substrate and at least one boundary positioned in the substrate and defining a cavity. The boundary is substantially non-transmissive and absorbing for wavelengths of stray light present in the vicinity of the boundary. The boundary possesses substantial symmetry under at least one symmetry group operation.

34 Claims, 12 Drawing Sheets

RESONATOR CAVITY FOR OPTICAL ISOLATION

FIELD OF THE INVENTION

The present invention relates to the fabrication of an optical waveguide device for optical isolation of a light emitter, a scattered light source or a light detector. The invention discloses a versatile resonator structure that is formed using a reflective absorbing boundary around a device and which can be applied substantially independently of the actual geometry of the device to be isolated.

BACKGROUND OF THE INVENTION

The manipulation of input and output light signals to and from optical fiber transmission lines generally requires that the signals be processed in some fashion, examples of which might include amplification, power splitting or the addition and/or dropping of signals. With the persistent trend towards miniaturization and integration, the optical circuits which best serve these processing functions are more and more being integrated on optical chips as a single module. The resulting optical circuits, which carry channel waveguides as their fundamental light-guiding elements, are generally referred to as planar lightwave circuits or PLCs. Current planar waveguide technology typically prepares a PLC by lithographically patterning light-guiding channels either directly upon (or buried beneath) the surface of a rigid planar substrate, or within a sequence of dielectric films separately deposited on the substrate.

In cases where the waveguide channels are formed in direct association with the substrate the substrate composition is usually chosen with a view to taking advantage of its specific electronic or electro-optic properties in addition to its mechanical characteristics. Patterning can be induced by ion exchange or by metallic diffusion. As an example of the latter process, a metallic film that has already been lithographically formed into a channel pattern can be heated to a temperature sufficient to induce a thermal diffusion of metal atoms into the surface region of the substrate (e.g. U.S. Pat. No. 5,749,132 by A. Mahapatra and S. A. Narayanan). In this manner a high-refractive-index light-guiding waveguide pattern can be created close to the surface of the substrate. The guides so formed can then be buried, if desired, by utilizing a second thermal-diffusion patterning process employing a metal that is able to generate a lower-refractive-index covering.

In PLCs where the waveguide channels are formed within a sequence of dielectric films deposited on a rigid substrate, the substrate usually plays only a thermal-mechanical roll. For these structures, the simplest situation sees the deposition of a sequence of three films (often referred to respectively as lower cladding (or buffer), core, and upper cladding) utilizing photolithography to pattern the required waveguide and component designs into the core layer. The refractive index of the core composition is chosen to be larger than those of the cladding layers to ensure good optical confinement within the core waveguides. An exposition of this general technology can be found in U.S. Pat. No. 4,902,086 by C. H. Henry et al.

In the context of the present invention the term 'planar lightwave circuit' (or PLC) should be interpreted to embrace all light-guiding circuits patterned into or onto rigid planar substrates. In particular, it should not be construed as limited to the specific categories examples of which have been described above.

In addition to signal processing circuits, which comprise optical network nodes, network termination points, such as light transmitters and light receivers, can also be integrated with other elements on a single PLC chip. Examples of light transmitters that can be so integrated are heterostructure end-emitting lasers, vertical cavity surface-emitting lasers and light emitting diodes. The most commonly used integrated light receivers are different types of photodiodes. For both transmitters and receivers, it is necessary that they be coupled to a single well-defined set of optical modes in the planar lightwave circuit. Generally the optical modes that carry the light signal around the optical chip are confined modes guided by waveguide channels. However, there are other unconfined optical modes (often designated as 'radiation modes' or 'stray light') present in the chip. These can enter devices on the chip and severely limit their performance. It therefore becomes necessary to design features that are capable of significantly limiting the undesirable access unconfined modes to these devices.

Light power in such radiation modes is almost exclusively scattered light, and there are usually several sources of scattered light on the optical chip. For example, there can be substantial power present on an optical chip in radiation modes due to imperfect coupling of a fiber to a planar waveguide at the chip interface. While it is disadvantageous to couple any power from a light signal into radiation modes on the chip, this is difficult to avoid in practice. Signal processing devices on the PLC chip can also be sources of scattered light. These sources are either there by design, such as in some types of variable optical attenuators where redundant light is dumped into the cladding, or they occur because of fabrication imperfections. On active chips, such as in waveguide amplifiers, another source of scattered light is amplified spontaneous emission from the gain material deposited on the chip. At the receiver end of the optical network, scattered light from any the above sources may interfere with the light signal propagating in a waveguide and can cause major signal degradation.

Figure 1A:
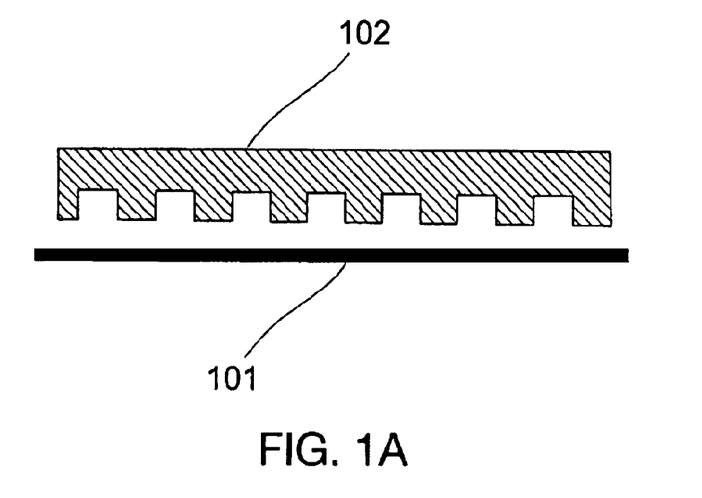
Figure 1B:
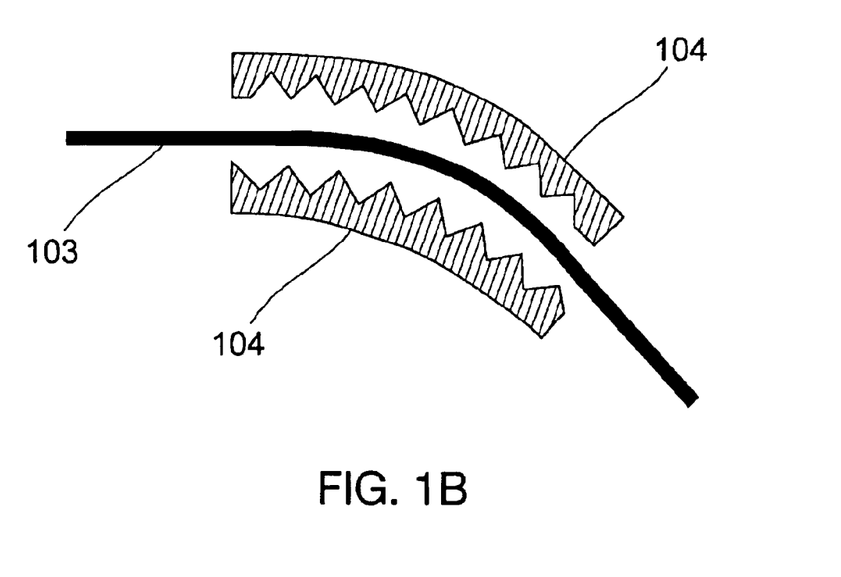

It therefore becomes necessary to devise a structure that can be used for optical isolation. Such a structure focuses on isolating a specific PLC device (such as the receiver) from light in radiation modes, but it can also be structured to isolate individual sources of scattered light from the rest of the chip. One common method of isolation in this context is the use of deep air trenches, geometrically positioned in a manner that can optimally intercept stray light that is propagating substantially parallel to a waveguide and redirect it away from the sensitive locations (see, for example, Pat. No. WO02097491 by D. Kitcher et al.). Another method is the introduction of light-absorbing regions to severely attenuate, rather than redirect, problematic radiation modes. In addition to the careful positioning of absorbing regions, the efficiency of stray light capture can be improved by decorating their shapes with protruding or notched facets to facilitate a more efficient coupling of scattered light into these lossy regions (see, for example, Pat. Nos. EP0883000 by T. S. Hoekstra, and WO03007034 by I. E. Day et al.). The structure by Day et al. is illustrated in FIG. 1.$a$, and comprises a waveguide 101, and light absorbing doped regions 102. The above references are directed solely to intercept stray light that propagates substantially parallel to the waveguide and therefore they rely on the proximity of the absorbing regions to the waveguide for efficient stray light absorption. Another approach to optical isolation is a monomode spatial optical filter (U.S. Pat. No. 5,093,884 by Gidon et al.), which is illustrated in FIG. 1.$b$), and comprises a curved waveguide section 103 and a light absorber 104 with an irregular sawtooth pattern and a geometrically asymmetrical shape with respect to the waveguide axis.

SUMMARY OF THE INVENTION

The present invention greatly improves upon the efficiency of capture (and subsequent attenuation) of stray light that is achievable by the conventional devices. The invention does so by introducing the concept of absorbing resonant cavities, in which scattered light is coupled into resonator chambers bounded by reflective absorbing surfaces. More specifically, the invention is directed to a resonant cavity bounded by a reflective absorbing boundary around the device to be isolated. The cavity has at least one opening to allow for a light signal to couple into or out of the device. The boundary of the cavity is non-transmitting as well as partially reflecting and absorbing for wavelengths of the scattered light. Light that is not directed at the device, either directly, or indirectly by use of a waveguide, is coupled into one or more cavity modes. Light in the cavity modes is either reflected out of the cavity or is substantially attenuated before arriving at the device.

BRIEF DESCRIPTION OF THE DRAWINGS

FIG. 1.a. Schematic of a prior art optical isolator based on doped dielectric regions near a waveguide.

FIG. 1.b. Schematic of a prior art monomode spatial optical filter based on absorbers near a curved waveguide.

FIG. 4.a. Schematic of an optically isolated PIN detector.

FIG. 4.b. Schematic cross-sectional side view of an optically isolator cavity around a PIN detector.

FIG. 6.a. A histogram of light ray attenuation for a straight optical isolator cavity.

FIG. 6.b. A plot of light ray attenuation for a straight optical isolator cavity versus ray exit angle.

FIG. 7.a. Schematic of a concave optical isolator cavity with curved boundaries with mirror symmetry.

FIG. 7.b. Schematic of a concave optical isolator cavity with perpendicular boundaries with mirror and rotational symmetries.

FIG. 7.c. Schematic of a concave optical isolator cavity with arbitrary straight boundaries with rotational symmetry.

FIG. 7.d. Schematic of an optical isolator cavity with arbitrary asymmetric boundaries.

FIG. 8.a. Schematic of an sawtooth type optical isolator cavity comprising a series of identical concave cavities.

FIG. 8.b. Schematic of an optical isolator cavity comprising a series of concave and straight cavities.

FIG. 8.c. Schematic of an optical isolator cavity comprising a symmetric cavity and additional asymmetric cavity boundaries.

FIG. 10.a. A histogram of light ray attenuation for a sawtooth optical isolator cavity.

FIG. 10.b. A plot of light ray attenuation for a sawtooth optical isolator cavity versus ray exit angle.

FIG. 12.a. Schematic of a straight optical isolator cavity around an optical tap monitor.

FIG. 12.b. Schematic of a sawtooth optical isolator cavity around an optical tap monitor.

FIG. 13.a. A histogram of light ray attenuation for a straight optical isolator cavity around an optical tap monitor.

FIG. 13.a. A histogram of light ray attenuation for a sawtooth optical isolator cavity around an optical tap monitor.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
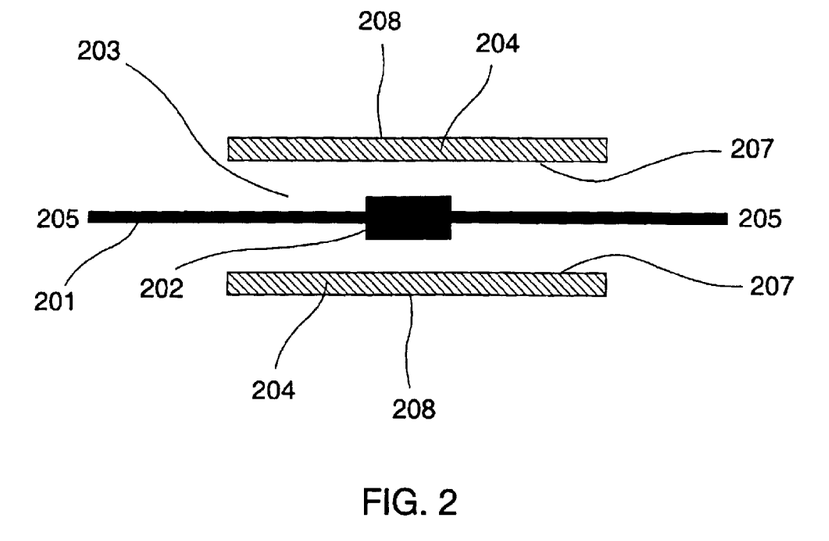
FIG. 2. Schematic of a straight optical isolator cavity.

Embodiment 1 of the invention is illustrated in FIG. 2. The invention comprises a cavity 203 defined by at least one absorbing reflective boundaries 204. The cavity 203 has at least one open port 205 for a waveguide 201 to carry an optical signal through the cavity 203. An optical device 202 may be inside the cavity 203. A light signal can be input using the waveguide 201 at one of the ports 205. Scattered light is also present in the proximity of the ports 205 and can enter the cavity 203. The inner edges 207 of the regions 204 as well as the outer edges 208 of the boundaries 204 are substantially non-transmissive for wavelengths of the scattered light present. The outer edges 208 function as optical isolators for the device 202 to protect it from scattered light that would be directly incident on the device 202 if the boundaries 208 was absent. The cavity 203 defined by the inner edges 207 serves as an absorber for scattered light that enters the ports 205. Scattered light inside the cavity 203 is reflected and absorbed each time a light ray hits an inner edge 207. The two main effects of optical isolation are twofold. First, the power density of the scattered light near the device 202 is substantially decreased as compared to the case when the boundaries 204 are absent. Second, any stray light entering a port 205 will be substantially attenuated by the time the light exits the cavity 203 via another port 205.

Figure 3:
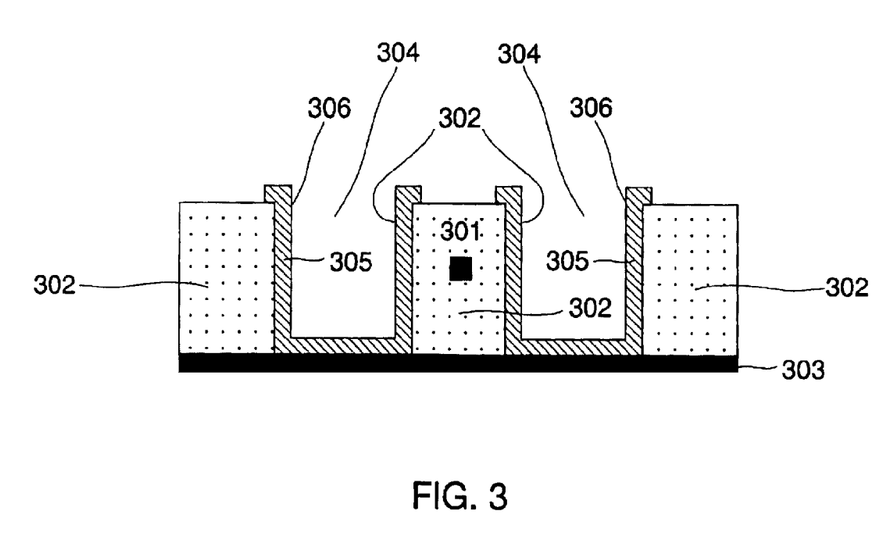
FIG. 3. Schematic cross-sectional side view of an optical isolator cavity.

FIG. 3 shows a schematic cross-section of this embodiment of the light absorbing cavity. The device 301 is embedded in a cladding material 302, which in turn is positioned on a silicon wafer 303. The absorbing reflective regions are created by etching trenches 304 through the cladding material 302 substantially approaching the silicon wafer 303. In the next processing step, one ore more metal layers 305 are deposited to cover the walls of the trenches 304. Optionally, some of the metal can subsequently be removed to expose other parts of the PLC. The absorbing reflective regions are now defined by the metal layers on the outer walls 306 of the trenches 304 and the metal layers on the inner walls 307 of the trenches 304. Scattered light in the cladding that is incident on the metal layers 305 will be partially reflected and partially absorbed by the metal and thus the device 301 will be optically isolated from scattered light.

Figure 4A:
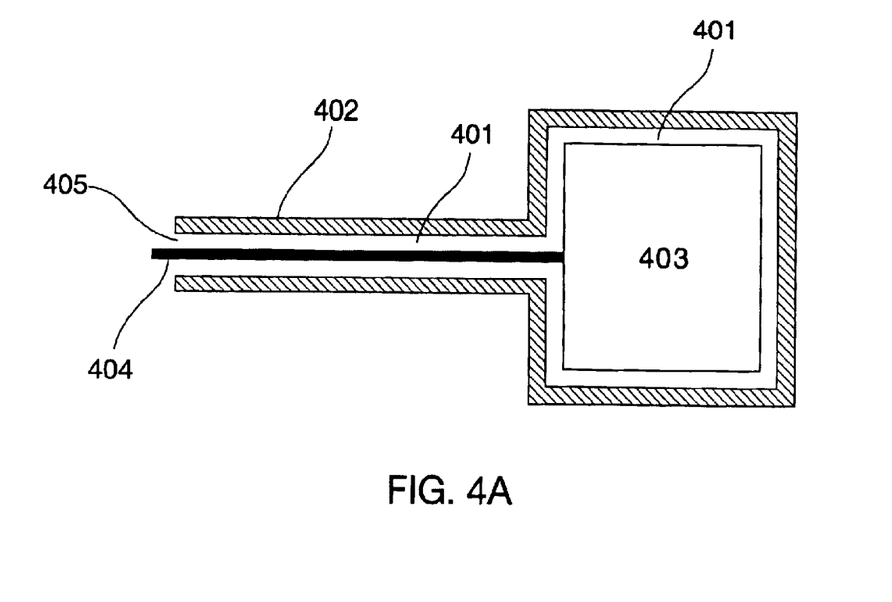
Figure 4B:
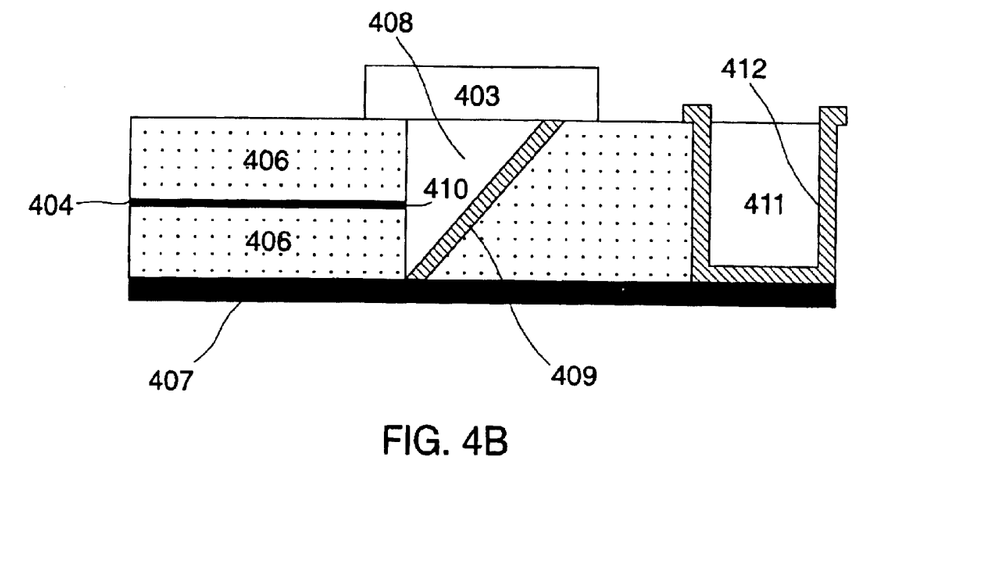

Embodiment 2 of the invention is illustrated in FIGS. 4.a and b. The structure comprises straight cavity 401 defined by an absorbing reflective boundary 402. Inside the cavity 401, a PIN detector 403 is fabricated that detects light directed towards it by the waveguide 404. A substantial portion of the scattered light that enters through the cavity opening 405 will be absorbed inside the cavity 401 before it reaches the PIN detector 403. FIG. 4.*b* shows a cross-sectional side view of the structure taken along the waveguide 404. The waveguide 404 is embedded in a cladding material 406, which in turn is positioned on top of a silicon wafer 407. A trench 408, whose cross-section is triangular, is etched through the cladding material 406 and the waveguide 404 and a metal layer is deposited on the angled side of the trench 408 to form the turning mirror 409. Light guided in the waveguide 404 enters the trench 408 via the waveguide termination 410, is reflected from the turning mirror 409 toward the PIN detector 403. The absorbing reflective boundary for optical isolation can be defined in the same manner as illustrated in FIG. 3. The resulting structure in cross-section comprises the trench 411 and the metal layer 412 deposited inside the trench 411.

Figure 5:
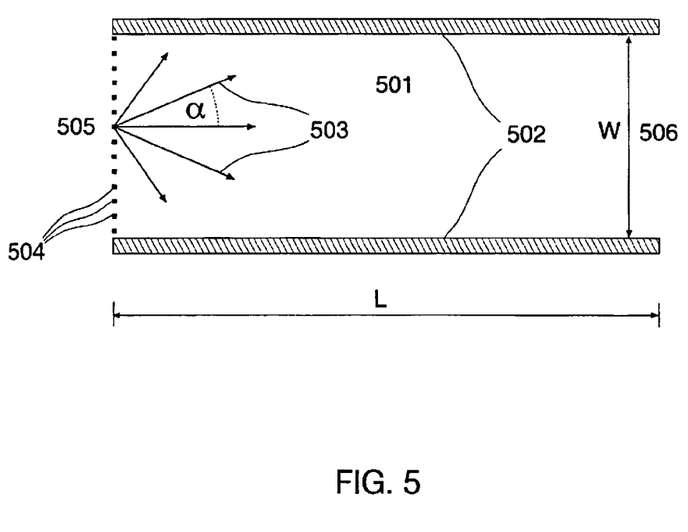
FIG. 5. Schematic of light ray propagation in a straight optical isolator cavity.

To evaluate the optical isolation efficiency of the straight absorbing cavity, we calculate the attenuation for scattered light rays originating at the cavity opening 405 and detected by the PIN detector using a ray tracing model. With reference to FIG. 5, the cavity 501 is defined by its straight boundaries 502 and has length L and width W. Scattered light rays 503 are assumed to originate at N equidistant points 504 at the cavity opening 505 substantially covering the entire opening. From each originating point 504, we follow M light rays 503. Each light ray and the cavity boundaries 504 enclose a propagation angle a which is randomly chosen from the range [−90°, 90°]. The light rays are partially reflected and partially absorbed whenever they hit a cavity boundary 504. The portion R of the light power that is reflected is related to the angle of incidence θ as follows:

$$R = \left| \frac{n\cos\theta - n_a}{n\cos\theta + n_a} \right|^2$$

where n is the refractive index of the cladding material and $n_a$ is the complex refractive index of the material comprising the cavity boundaries at each reflection. The portion of the light that is not reflected is absorbed by the cavity walls. By following light rays, we can calculate the attenuation for each light ray as they arrive at the PIN detector that is positioned at the cavity end 505.

Figure 6A:
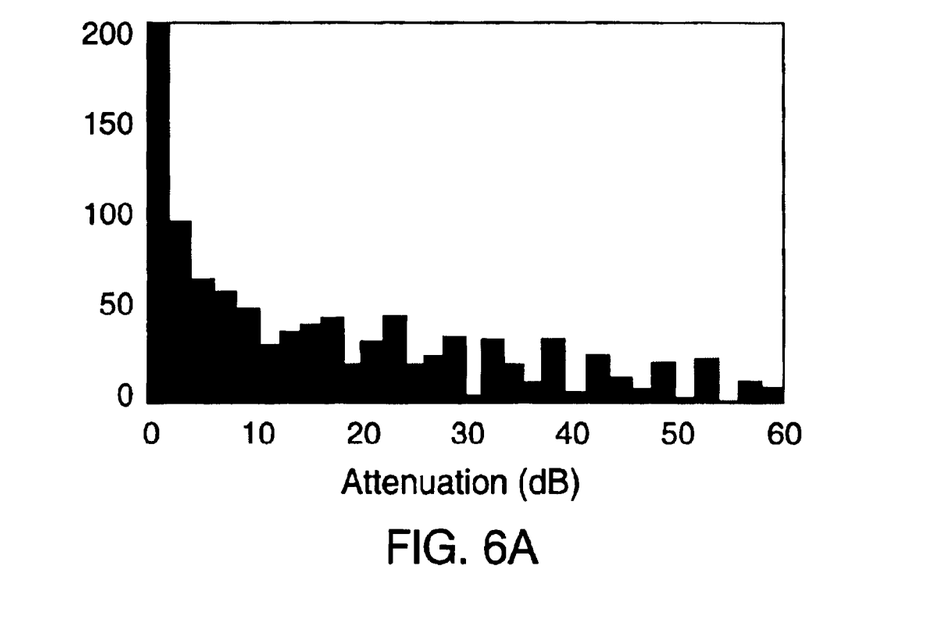

We plot the results of the model in FIG. 6 for parameter values L=1 mm and W=0.05 mm, N=20, M=100, n=1.444 corresponding to silica and $n_a$=4.04+3.82i corresponding to titanium at 1.55 μm wavelength. The histogram in FIG. 6.*a* shows the distribution of light power attenuation in the range [0 dB, 60 dB] for light rays detected by the PIN detector. The graph illustrates that out of the 2000 light rays followed during the simulation about 10% reaches the detector directly with small or no attenuation. These are the light rays that propagate through the cavity substantially parallel to the cavity walls and are detected by the PIN detector after a few or no reflections. The rest of the rays are substantially attenuated.

Figure 6B:
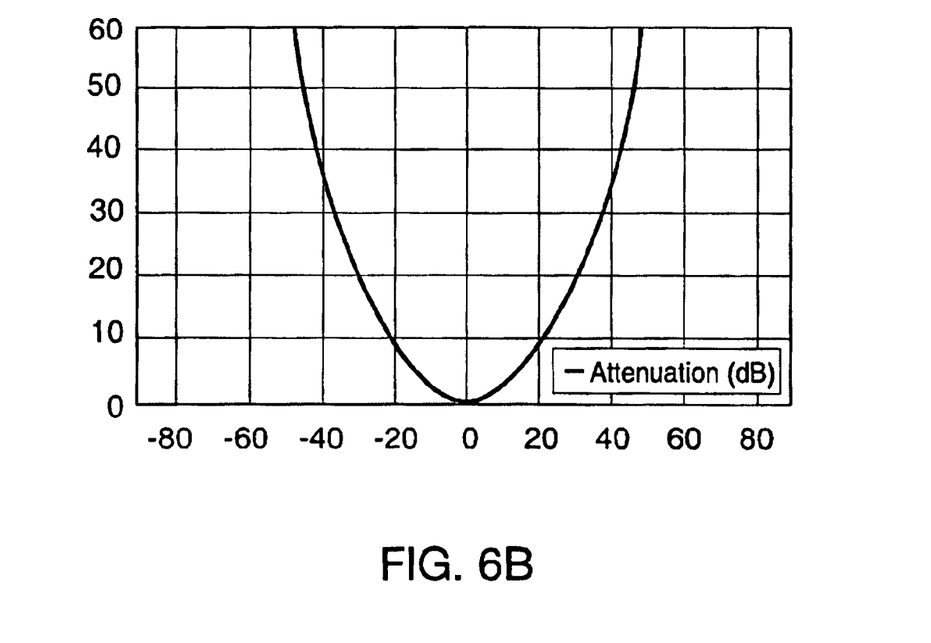

The light attenuation inside the cavity results in a narrowing of the scattered light beam exiting at the output port of the cavity into the PIN detector. To quantify the beam divergence, we approximate analytically the angular dependence of the light intensity at the output port. The propagation angle β enclosed by a light ray and the cavity boundaries at the output port is β=±α, depending on whether the number of reflections suffered by the light ray is even or odd. FIG. 6.*b* shows the simulated dependence of the attenuation on the propagation angle β. Since the number of reflections suffered by a light ray during its propagation through the cavity is approximately |L tan β/W|, the total attenuation (in dB) as a function of the propagation angle follows the functional form $$-\frac{20L\tan\beta}{W\ln 10}\ln\left|\frac{n\sin\beta - n_a}{n\sin\beta + n_a}\right|.$$

Approximating this expression for small angles, we obtain that the angular intensity distribution of the scattered light beam is $$\exp\left(-\frac{4nL}{|n_a|W}\beta^2\right)$$

which is a Gaussian beam with full angular width of $$\sqrt{|n_a|W/2nL}$$

based on the $1/e^2$ points). In this case, the full angular width is about 36°.

A figure of merit that can be used to illustrate how well scattered light is attenuated by the cavity is the attenuation efficiency, defined as p ρ=1−$P_d$/P, where $P_d$ is the total light power reaching a detector at one end of the cavity and $P_i$ is the light power input at the input port of the cavity. Attenuation efficiency is between zero (meaning no attenuation is achieved) and one (meaning complete attenuation). We first compute the attenuation efficiency for a cavity whose walls are perfectly absorbing and non-reflecting. The perfectly absorbing cavity only allows light through in angle subtended by the end of the cavity at the originating point of the light ray. The efficiency for the perfectly absorbing cavity of width W and length L can be straightforwardly calculated as $$\rho_p = 1 - \frac{1}{\pi W}\int_{-W/2}^{W/2} dy\,\arctan\frac{WL}{L^2 - W^2/4 + y^2} = \frac{2}{\pi}\arctan\frac{L}{W} - \frac{L}{\pi W}\ln\frac{L^2}{W^2 + L^2}$$

We will use this as an ideal but non-physical benchmark to evaluate the attenuation efficiency of resonant cavities. For the straight cavity whose characteristics are plotted in FIG. 6, ρ=0.86, while for a perfectly absorbing cavity of the same dimensions $\rho_p$=0.984.

Embodiment 3 of the invention is illustrated in FIG. 7. With reference to FIG. 7.*a*, the invention comprises a cavity 701 defined by at least two absorbing reflective boundary 702 on both sides of the waveguide 703. In this embodiment, the cavity 701 has a concave shape as viewed from inside. This shape results in a higher attenuation for a light ray entering the cavity than in the case of a straight cavity of Embodiment 1. Most light rays incident on a boundary 702 are not only redirected towards another inside cavity boundary 702 as in the case of a straight cavity but the propagation angle also changes substantially. In fact, a scattered light ray originating at port 704 may be reflected in such a way that it will propagate backwards, towards port 704. The shape of the cavity forces the light ray to suffer more reflections before it exits the cavity than in a straight cavity and thus it will experience higher attenuation. The cavity may have other concave shapes as well, such as illustrated in FIGS. 7.*b* and *c*. FIG. 7.*b* shows schematically a cavity 705 defined by two sets of perpendicular absorbing reflective boundary sections 706 and 707, both of which boundaries enclose an approximately 45° angle with the waveguide 708. The advantage of this particular embodiment is that it never redirects scattered light that is not propagating substantially parallel to the waveguide 708 to become substantially parallel to the waveguide 708. However, as illustrated in FIG. 7.*c*, the absorbing reflective boundary sections 709 and 710 may define any angle with each other and with the waveguide 711.

Figure 7A:
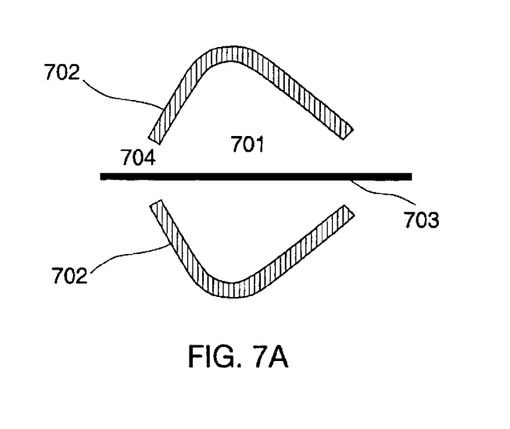
Figure 7B:
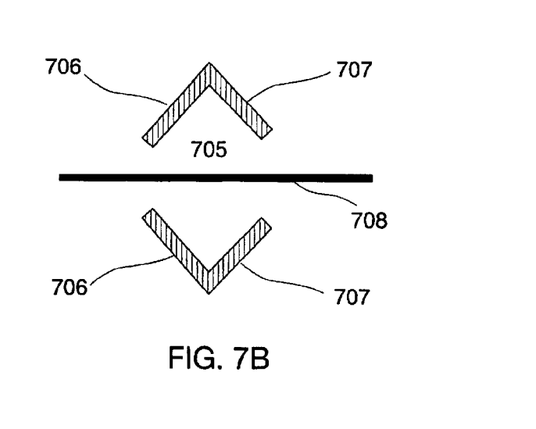
Figure 7C:
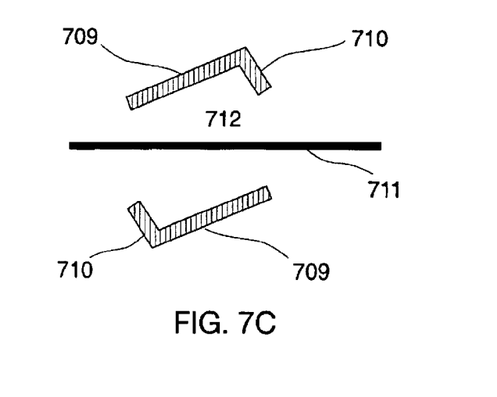

For the purposes of stray light absorption, it is advantageous for the cavity to be symmetric, that is, to possess symmetry under one or more symmetry group operation. Such symmetry group operations are, for instance, reflection with respect to a line (mirror symmetry), reflection or rotation with respect to a point (point symmetry) or linear translation (translational symmetry). The cavities 701 and 705 in FIGS. 7.*a* and *b* possess mirror symmetry with respect to the optical axes 703 and 708, respectively. However, the resonant cavity may possess a mirror symmetry with respect to arbitrary line enclosing an arbitrary angle with the optical axis of the waveguide. One example is cavity 705 in FIG. 7.*b*, where a symmetry axis is perpendicular to the optical waveguide axis 708. To put it another way, the waveguide need not follow the symmetry axis of the cavity for the cavity to effectively isolate the region optically. The cavities 705 and 712 in FIGS. 7.*b* and *c* possess rotational symmetry as well, because there is a specific non-zero angle (i.e. 180°) by which the cavity can be rotated around a pre-selected point and the rotated image coincides with the original. This angle can be an arbitrary angle, not necessarily 180°. The symmetry operations may be combined in series to obtain additional symmetries.

Figure 7D:
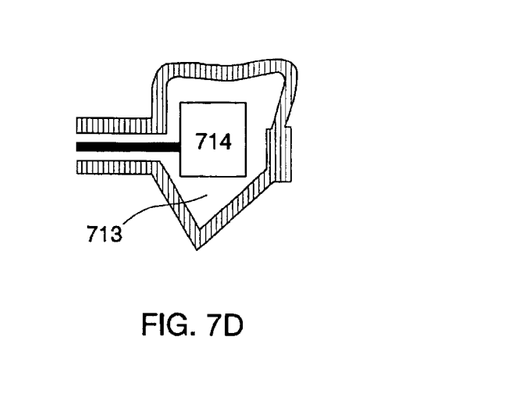

It is also understood that slight variations in design or fabrication that destroy perfect symmetry for the cavity will not substantially change the optical isolation properties of the resonant cavity. However, even though for the purposes of absorbing stray light in the cavity, it is advisable for the cavity to be substantially symmetric, the cavity need not possess any symmetry to be functional if the objective is to block light directly incident on the device to be protected. This is the case, for instance, for the cavity directly surrounding the detector in the optical tap monitor depicted in FIG. 4. An asymmetric version of the cavity 713 protecting the detector 714 is shown in FIG. 7.*d*.

Figure 8A:
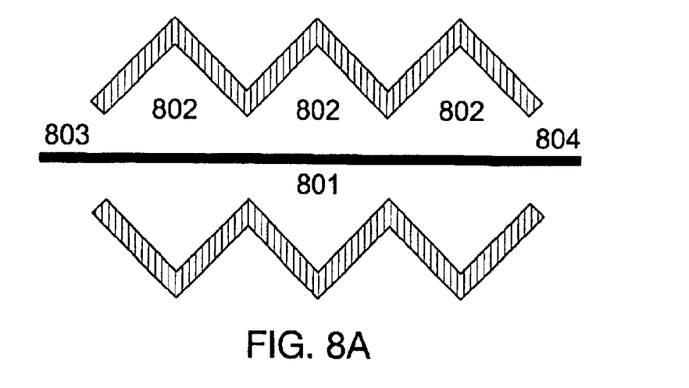
Figure 8B:
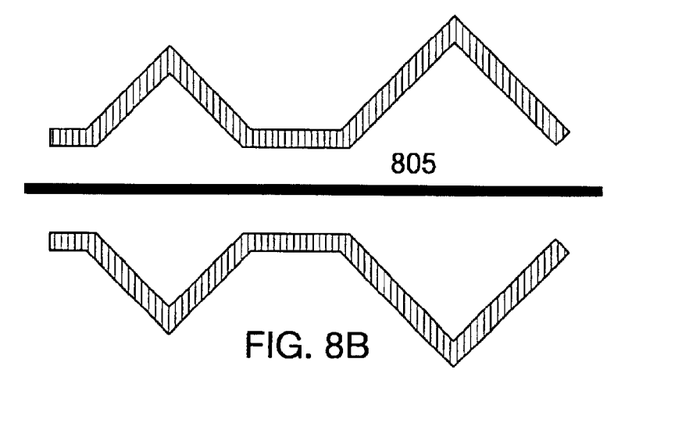
Figure 8C:
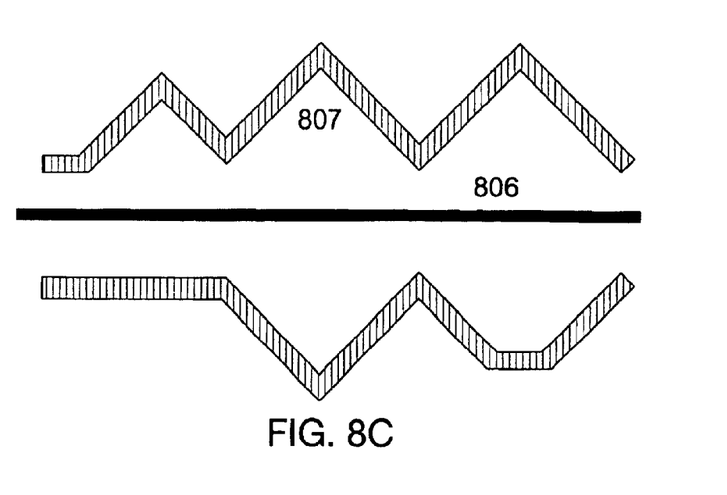

Embodiment 4 of the invention is illustrated in FIG. 8. In this embodiment, absorbing reflective trenches of the previous embodiments are combined in series to increase the effectiveness of attenuation. With reference to FIG. 8.*a*, the sawtooth type cavity 801 comprises a series of identical cavities 802 shown in FIG. 7.*b*. Scattered light entering at port 803 is well attenuated by the time it exist the cavity at port 804. One can take any combination of single cavities with any parameters to construct longer, more efficient cavities, as illustrated in FIG. 8.*b*, where the cavity 805 comprises a series of straight and concave cavities. An irregular series of single cavities may improve the efficiency of attenuation. As mentioned above, it is advantageous for a light absorbing cavity to possess some symmetry. FIG. 8.*c* shows schematically a cavity 806 which consists of a series of cavities, but in this case only one cavity 807 of those comprising cavity 806 is symmetric. Other sections of the cavity boundary may serve a different purpose, such as redirecting light rays in a different direction, or connecting cavities.

Figure 9:
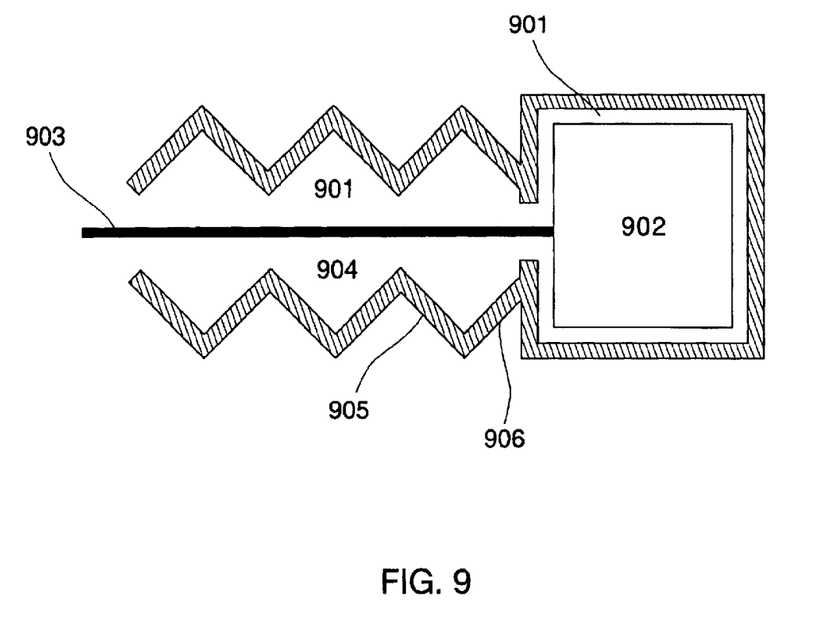
FIG. 9. Schematic of an optical isolator sawtooth cavity around a PIN detector.

Embodiment 5 of the invention is illustrated in FIG. 9. This structure is a cavity 901 which surrounds a PIN detector 902 and a waveguide 903 guiding a light signal towards the detector 902. The cavity 901 contains a sawtooth cavity 904 of Embodiment 4. The cavity 901 is an improvement over the straight cavity of Embodiment 2. To estimate the degree of improvement, we calculate the attenuation of scattered light rays using a ray tracing method, illustrated previously in FIG. 5 with the same parameters. We assume that the concave cavities 902 are identical and are bounded on each side by two straight boundary sections 905 and 906 that are perpendicular to each other and enclose a 45° angle with the waveguide 904. The smallest extent of the cavity 901 perpendicular to the waveguide 904 is 50 μm and the length of the cavity 901 is also 1 mm as in the case of the analysis for Embodiment 2. The largest extent of the cavity 901 perpendicular to the waveguide 904 is 150 μm.

Figure 10A:
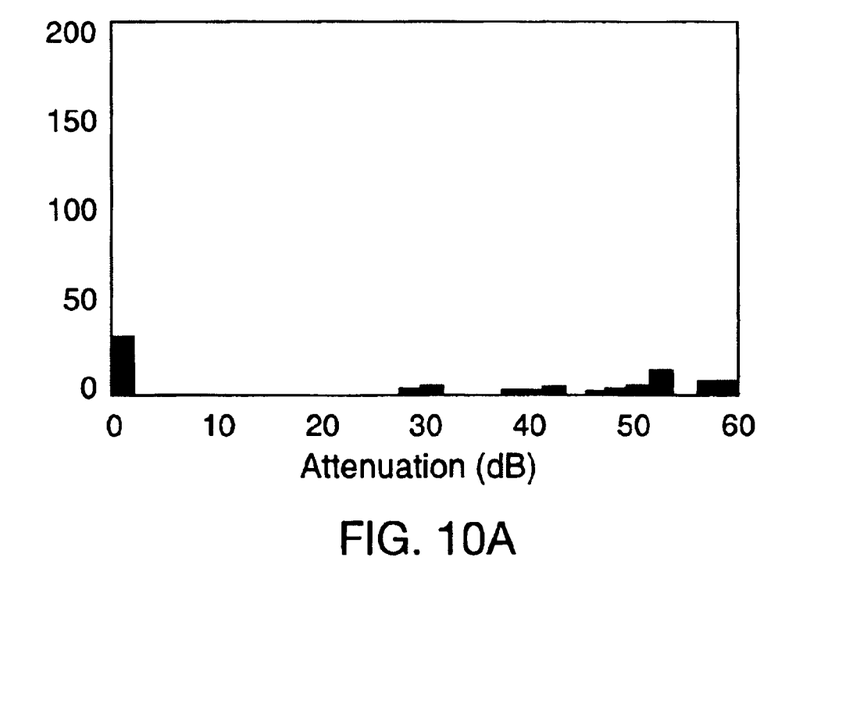
Figure 10B:
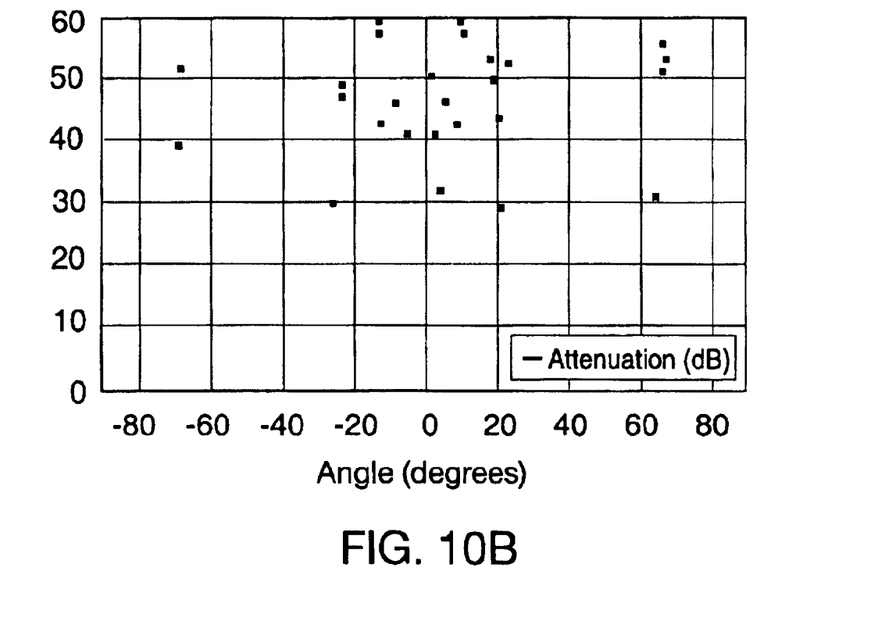

The results of the simulation are shown in FIG. 10. The histogram in FIG. 10.*a* shows the distribution of light power attenuation in the range [0 dB, 60 dB] for light rays detected by the PIN detector. The graph illustrates that out of the 2000 light rays followed during the simulation less than 2% reaches the detector directly with no attenuation. These are the light rays that propagate through the cavity substantially parallel to the cavity boundaries and suffer no reflections before being directly detected by the PIN detector. The rest of the rays that hit the cavity boundaries at least once suffer a large number of reflections due to the concave nature of the resonators comprising the cavity. These rays are attenuated by at least 29.9 dB by the time they are detected by the PIN detector. The graph in FIG 10.*b* shows the angular dependence of the attenuation. Only the very narrow range of rays with exit angles between ±1.5° are not attenuated by the cavity.

Figure 11:
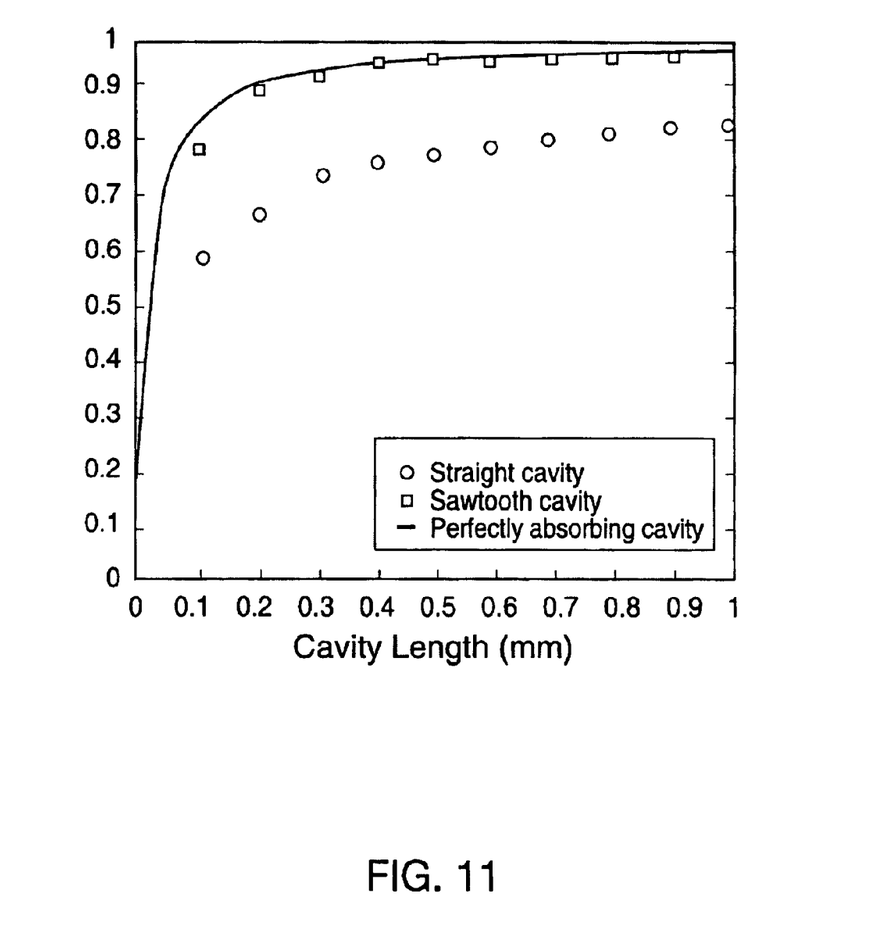
FIG. 11. A plot of attenuation efficiency versus cavity length for a straight, sawtooth and perfectly absorbing optical isolator cavity.

To further demonstrate the optical isolation efficiency of resonant cavities, we plot in FIG. 11 a graph of the attenuation efficiency ρ versus the length of the cavities for a straight cavity of Embodiment 2, for a sawtooth cavity of Embodiment 5 as well as for a perfectly absorbing cavity for comparison. The parameters (other than their length) of the cavities are the same as for the ones whose simulation results are illustrated in FIGS. 6 and 10. The graph shows that even the straight cavity has a high attenuation efficiency of larger than 0.7 for lengths larger than 0.4 mm and that the attenuation efficiency of the sawtooth cavity is almost identical to that of the perfectly absorbing cavity for lengths larger than 0.2 mm.

Figure 12A:
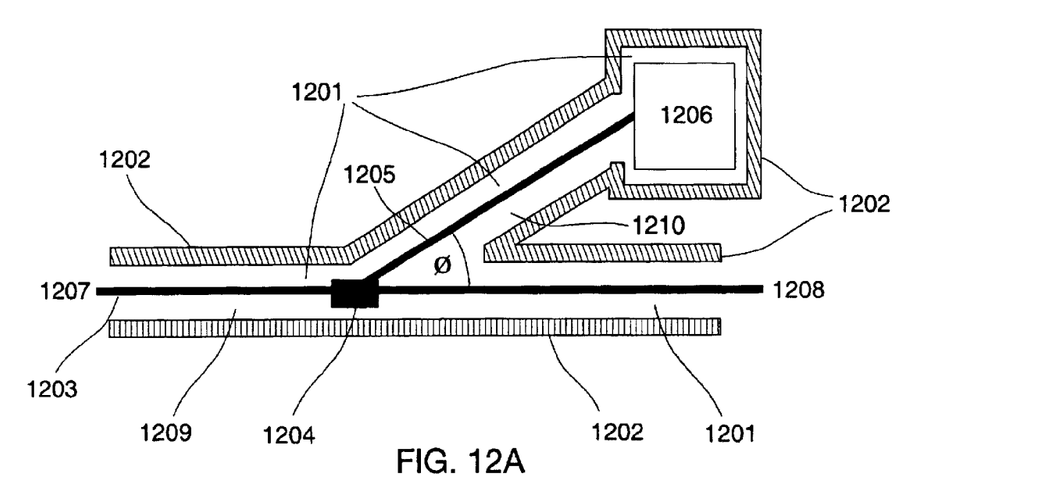

Embodiment 6 of the invention is illustrated in FIG. 12. With reference to FIG. 12.*a*, the structure comprises a cavity 1201 defined by straight boundaries 1202. The cavity surrounds a signal waveguide 1203, an optical tapping device 1204, a tap waveguide 1205 and a PIN detector 1206. An optical signal passes through the waveguide 1203 from input port 1207 and most of it propagates through to output port 1208. Some of the signal power is tapped of for monitoring purposes at the optical tap 1204 and is sent to the tap waveguide 1205 to the PIN detector 1206. This optical monitoring device is protected from scattered light that would be directly incident on the PIN detector area 1206. However, scattered light can enter through the open input port 1207 and the output port 1208. The cavity 1201 surrounding the optical tap monitor structure attenuates scattered light before this light arrives at the PIN detector 1206. This cavity 1201 is an improvement over previous embodiments The cavity 1201 comprises at least two straight cavities 1209 and 1210 whose axes are at an angle φ with each other. The scattered light beam that enters port 1207 will be a Gaussian beam with a narrow angular waist by the time it arrives at the tap device 1204. Due to the angular offset of the cavity 1210, only a small portion of this beam will enter cavity 1210, thus improving the overall attenuation efficiency of the cavity 1201. By increasing the angle φ, the attenuation efficiency can be further improved.

Figure 12B:
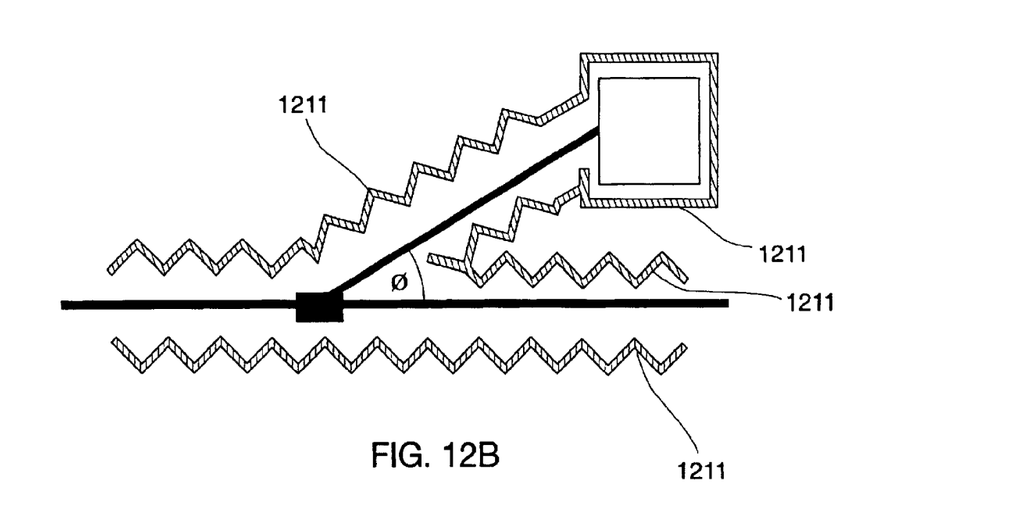

FIG. 12.b illustrates Embodiment 7 of the invention. This structure is an improvement over Embodiment 6 in that the straight boundaries 1202 is now replaced by sawtooth boundaries 1211 which results in a higher attenuation efficiency.

Figure 13A:
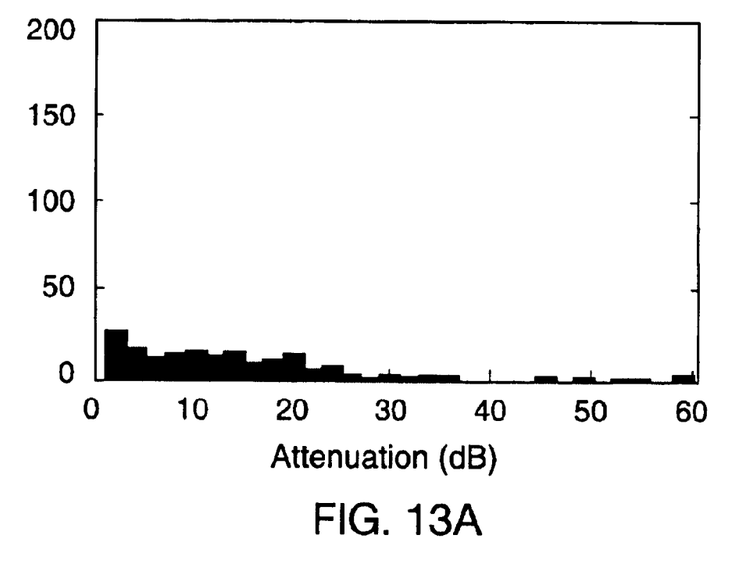
Figure 13B:
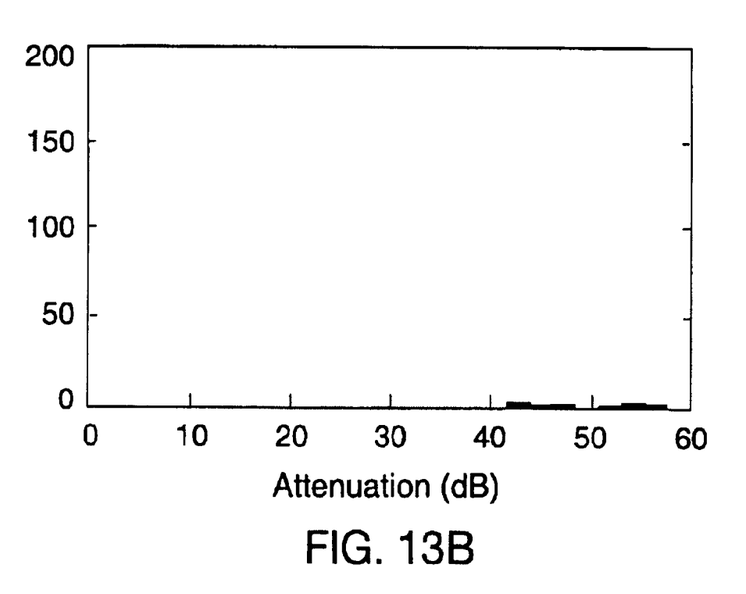

To evaluate the performance of these types of cavities, we model light propagation in the cavities using a ray tracing method described above, with scattered light rays entering the cavities both from the input and the output ports. The results of the simulation are displayed in FIG. 13. The histograms in FIGS. 13.a and b show the distribution of power attenuation for 2000 light rays detected by the detector that originate at the input and output ports of a cavity with straight and sawtooth boundaries, respectively. While most light rays are well attenuated for the straight cavity, about 1.5% of them reach the detector with about a 1 dB attenuation. The sawtooth cavity achieves an even better performance: even for the strongest ray reaching the detector, the attenuation is over 35 dB. The attenuation efficiency for the straight cavity is 0.98 while that of the sawtooth cavity is a near perfect 0.99999975.

What is claimed is:

1. A planar lightwave circuit comprising:
   a substrate;
   at least one boundary positioned in the substrate and defining a cavity; said boundary being substantially non-transmissive and absorbing for wavelengths of stray light present in the vicinity of said boundary;
   said boundary possessing substantial symmetry under at least one symmetry group operation.

2. The planar lightwave circuit of claim 1 where said at least one boundary is a straight line.

3. The planar lightwave circuit of claim 1 where said at least one boundary has a substantially sawtooth shape.

4. The planar lightwave circuit of claim 1 wherein said at least one boundary comprises a plurality of boundary sections.

5. The planar lightwave circuit of claim 1 where said at least one boundary is formed from a trench etched into said substrate, said trench having surfaces covered with an absorbing material.

6. The planar lightwave circuit of claim 1 further comprising at least one waveguide located in said substrate.

7. The planar lightwave circuit of claim 1 further comprising a plurality of said cavities.

8. The planar lightwave circuit of claim 1 where the cavity further comprises at least one additional non-symmetrical boundary section.

9. The planar lightwave circuit of claim 1 further comprising a light detector located on said substrate and being surrounded by said at least one boundary.

10. The planar lightwave circuit of claim 1 further comprising a light emitter located on said substrate and being surrounded by said at least one boundary.

11. The planar lightwave circuit of claim 1 where the axes of said cavities enclose an acute angle.

12. A planar lightwave circuit comprising:
    a substrate;
    a substantially straight waveguide embedded in the substrate;
    at least one boundary positioned on both sides of the waveguide in the substrate and defining a cavity, said boundary being substantially non-transmissive and absorbing for wavelengths of stray light present in the vicinity of said waveguide.

13. The planar lightwave circuit of claim 12 where said at least one boundary is a straight line.

14. The planar lightwave circuit of claim 12 where said at least one boundary has a substantially sawtooth shape.

15. The planar lightwave circuit of claim 12 wherein said at least one boundary comprises a plurality of boundary sections.

16. The planar lightwave circuit of claim 12 where said at least one boundary is formed from a trench etched into said substrate, said trench having surfaces covered with an absorbing material.

17. The planar lightwave circuit of claim 12 further comprising at least one waveguide located in said substrate.

18. The planar lightwave circuit of claim 12 further comprising a plurality of said cavities.

19. The planar lightwave circuit of claim 12 where the cavity further comprises at least one additional non-symmetrical boundary section.

20. The planar lightwave circuit of claim 12 further comprising a light detector located on said substrate and being surrounded by said at least one boundary.

21. The planar lightwave circuit of claim 12 further comprising a light emitter located on said substrate and being surrounded by said at least one boundary.

22. The planar lightwave circuit of claim 12 where the axes of said cavities enclose an acute angle.

23. A planar lightwave circuit comprising:
    an optical device embedded in a substrate;
    a boundary positioned around said optical device and defining a cavity, said boundary being substantially non-transmissive for wavelengths of stray light present in the vicinity of said optical device.

24. The planar lightwave circuit of claim 23 wherein said boundary possesses substantial symmetry under at least one symmetry group operation.

25. The planar lightwave circuit of claim 23 wherein said boundary is non-symmetrical.

26. The planar lightwave circuit of claim 23 wherein said at least one boundary comprises a plurality of boundary sections.

27. The planar lightwave circuit of claim 23, where said at least one boundary is formed from a trench etched into said substrate, said trench having surfaces covered with an absorbing material.

28. The planar lightwave circuit of claim 23, further comprising at least one waveguide located in said substrate.

29. The planar lightwave circuit of claim 23 further comprising a plurality of said cavities.

30. The planar lightwave circuit of claim 23, where the cavity further comprises at least one additional non-symmetrical boundary section.

31. The planar lightwave circuit of claim 23 wherein said optical device is a light detector.

32. The planar lightwave circuit of claim 23 wherein said optical device is a light emitter.

33. A method of optically isolating an optical device embedded in a PLC, comprising:
    embedding the optical device in a substrate of the PLC;
    providing a boundary positioned around said optical device; said boundary being substantially non-transmissive for wavelengths of stray light present in the vicinity of said optical device.

34. A method of optically isolating a region located in a PLC, comprising:
    creating at least one boundary positioned in the substrate; said boundary being substantially non-transmissive and absorbing for wavelengths of stray light present in the vicinity of said boundary;
    said boundary possessing substantial symmetry under at least one symmetry group operation.

\* \* \* \* \*